(12) United States Patent
Heusser et al.

(10) Patent No.: US 7,320,335 B2
(45) Date of Patent: Jan. 22, 2008

(54) ELECTROHYDRAULIC CONTROL DEVICE

(75) Inventors: Martin Heusser, Munich (DE); Georg Neumair, Thalhausen (DE)

(73) Assignee: HAWE Hydraulik GmbH & Co. KG, Munich (DE)

( * ) Notice: Subject to any disclaimer, the term of this patent is extended or adjusted under 35 U.S.C. 154(b) by 233 days.

(21) Appl. No.: 11/062,051

(22) Filed: Feb. 18, 2005

(65) Prior Publication Data

US 2005/0199295 A1 Sep. 15, 2005

(30) Foreign Application Priority Data

Mar. 10, 2004 (DE) .................. 20 2004 003 749 U

(51) Int. Cl.
*F16K 31/06* (2006.01)

(52) U.S. Cl. ............................ 137/596.17; 137/625.65

(58) Field of Classification Search ........... 137/596.17, 137/625.65

See application file for complete search history.

(56) References Cited

U.S. PATENT DOCUMENTS 4,282,901 A * 8/1981 Satoh .................... 137/625.64
4,369,696 A * 1/1983 Klatt et al. .................... 91/465
5,309,944 A * 5/1994 Chikamatsu et al. .. 137/625.65
5,615,594 A * 4/1997 Duckinghaus ............... 91/433
5,960,695 A * 10/1999 Aardema et al. ............. 91/433
6,176,261 B1 * 1/2001 Heusser ................. 137/596.13
6,328,275 B1 12/2001 Yang et al.
6,457,487 B1 * 10/2002 Stephenson et al. ... 137/596.16
6,705,079 B1 3/2004 Tabor et al.
2002/0162327 A1 11/2002 Stephenson et al.

FOREIGN PATENT DOCUMENTS

DE 195 00 748 A1 7/1996
EP 0 965 763 A1 12/1999
EP 1 338 802 A2 8/2003
JP 57107486 7/1982
WO WO 96/21808 * 7/1996

OTHER PUBLICATIONS

European Search Report for German Patent Application No. DE 02004003749, dated Oct. 5, 2004.

* cited by examiner

*Primary Examiner*—Gregory Huson
*Assistant Examiner*—Craig M. Schneider
(74) *Attorney, Agent, or Firm*—Cook, Alex, McFarron, Manzo, Cummings & Mehler, Ltd.

(57) ABSTRACT

A electrohydraulic control device H for the direction control of a hydro-motor, particularly for working pressures u to more than about 450 bar in a portable working device, comprises working lines A, B and a pressure line P and a respective load holding valve LA, LB in each working line A, B which load holding valve is switched from a load holding position for the respective working line to open to a return system R when a main directional solenoid seat valve VA, VB is in a switching position connecting the pressure source P with the respective other working line, and a circulation switching assembly U effective between the pressure source P and the return system R when the working lines A, B are separated from the pressure source P contains as the respective load holding valve LA, LB a 2/2-directional solenoid seat valve which selectively and electrically is switched open towards the return system R for, by intention, relieving the working pressure from the associated working line A, B.

10 Claims, 3 Drawing Sheets

ELECTROHYDRAULIC CONTROL DEVICE

Figure 1:
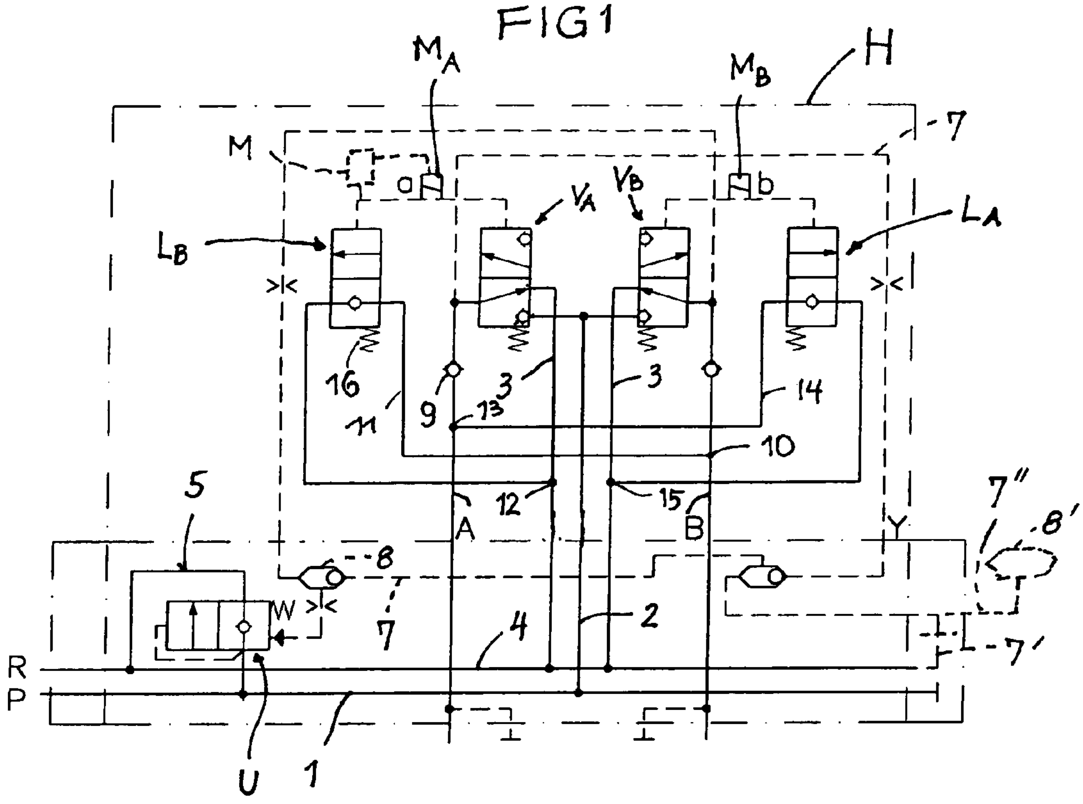

The electrohydraulic control device known from EP 0965 763 A contains hydraulically releasable check valves as the two load holding valves of the working lines. The main line solenoid seat valves are designed as 3/2-directional solenoid seat valves each of which either blocks a working line from the pressure source and connects the working line with the return or blocks the working line to the return and connects the working line to the pressure source, respectively. The pilot line system is supplied with the pilot pressure of the working line containing the respective higher working pressure, in order to actuate the circulation switching assembly. At the same time the pilot pressure derived from the working line containing the respective higher working pressure is used to open the load holding valve which holds the load pressure in the working line which is separated from the pressure source such that this working line is relived to the return system. Such electrohydraulic control devices, preferably, are used for portable working devices like screwing devices, riveting appliances, building displacement devices, and the like In such working devices extremely high working pressure can be used, e.g. up to about 800 bar and by employing a pressure source which operates with a relatively small displacement amount to reach the maximum pressure. Due to the high working pressures and the small displacement amounts seat valves having leakage free blocking positions are a must. However, the hydraulically releasable check valves used as the load holding valves result in the effect that the working pressure is maintained in at least one working line after switching off the control device. Due to the leakage free blocking position of the seat valves the working pressure is maintained during a very long time causing considerable operational hazards. Furthermore, it sometimes is necessary to open a connection of a working line after the control device was switched off. However, this cannot be done as long as working pressure is maintained. A forceful opening of the working line is dangerous or may result in contamination of the environment by the hydraulic medium In the pilot circuit of a multi-way valve processing water as the hydraulic medium and as known from DE 195 00 748 A 2/2 solenoid switching valves are provided for the pressure control of control chambers of four main valves. There are no load holding seat valves having a solenoid actuation.

In a multi-way valve without load holding valves as known from JP 57107486 A relief flow paths in control chambers and via loose sliding fit clearances of valve elements are kept open to the tank in the neutral position. Only the pressure of one working line can be relieved.

Both chambers of a hydraulic consumer integrated into a control device as known from EP 1 338 802 A are safeguarded by electrohydraulic proportional valves. Each of the electrohydraulic proportional valves consists of a 2/2 solenoid proportional pressure regulating valve and a 2/2 hydraulic proportional valve. Load holdings valves hermetically sealing any load leakage are missing.

Of interest are further: U.S. Pat. Nos. 6,705,079 B1, 6,328,275 B1, US 2002/0162327 A1.

It is an object of the invention to provide such an electrohydraulic control device having reduced operational hazard.

Since each load holding valve is a 2/2-directional solenoid seat valve which selectively and electrically can be switched open to the return system the working pressure does not need to be maintained permanently in any working line but the, in some cases, very high working pressure can be relieved without problems into the return system when the return holding valve is switched open electrically. This procedure may be carried out as a routine (by means of the associated control system) whenever the control device is switched off, or selectively in the case that for some reason a working line containing working pressure has to separated. The design of the load holding valve as a 2/2-directional solenoid seat valve, furthermore, has the advantage of a leakage free blocking position as long as the working pressure has to be maintained during operation.

To simplify the structure and the control technique it is expedient when the 2/2-directional solenoid valve of the respective one working line and the main directional solenoid seat valve of the other working line use a common switching solenoid. In the case that one working line is actuated the other working line will be relieved to the return system automatically.

Alternatively, it may be expedient for certain embodiments to provide the 2/2-directional solenoid seat valve for the respective one working line with its own switching solenoid which is actuated at the same time as the switching solenoid of the main directional solenoid seat valve of the other working line is actuated. This offers the advantage that upon pressure actuation of the one working line automatically the other working line is connected to the return system. Furthermore, the separate switching solenoid allows to even actuate the respective 2/2 directional solenoid seat valve independent from the operation of the switching solenoid of the main directional solenoid seat valve, and then to connect a working line containing working pressure to the return system. This is done by a selective actuation of the switching solenoid of the 2/2-directional solenoid seat valve the working line of which is to be relieved.

The pressure relieving procedure of a working line containing working pressure can be carried out comfortably when the pressure medium flow originating from the pressure source is circulated without pressure via the circulation switching assembly e.g. after the control device has been switched off. Then no significant pressure is present at the main directional solenoid seat valves for relieving one or both working lines when the respective 2/2-directional solenoid valve is switched open to the return system by a short switching pulse. The circulation switching assembly expediently is actuated by a load depending pilot pressure. The pilot pressure may be obtained via the pilot line system directly or indirectly from the respective working line or from the pressure line.

In order to reliably switch the circulation switching assembly into the position for the pressureless circulation, expediently a solenoid actuated pilot pressure relieving seat valve to the return system ought to be connected for each working line to the pilot line system. During normal operation the relieving seat valve is closed and seals without leakage such that the pilot pressure is maintained reliably. In the case that the relieving seat valve is controlled to the open position the pilot pressure immediately drops such that the circulation switching assembly switches into the position of the pressureless circulation.

Expediently also each relieving seat valve is actuated by the switching solenoid of the main directional solenoid seat valve. Alternatively, however, it would be possible to associate an individual switching solenoid to each relieving seat valve which switching solenoid then, for specific situations, can be actuated separately from the switching solenoid of the main directional solenoid seat valve.

The relieving seat valve may additionally fulfil the task of deriving the pilot pressure from the respective working line or alternatively from the pressure line. In such a case the relieving seat valve ought to be designed as a 3/2-directional solenoid seat valve.

In the case that the pilot pressure directly is obtained from the pressure line, however, the relieving seat valve, to the contrary, may be a simple 2/2 solenoid seat valve which only has to cope with a small pilot pressure flow rate and flow amount, i.e. may be designed relatively compact.

As is expedient in such devices the circulation switching assembly may contain a 2/2-directional circulation pressure balance valve which, expediently, is designed like a seat valve and is provided between the pressure line and the return system. The seat valve design is of advantage for the high working pressures because of a leakage free blocking position.

In order to exactly measure the amount of the pilot pressure medium in the pilot line system it may be expedient to associate a two-way flow rate regulator to the circulation pressure balance valve. The two-way flow rate regulator operates between the pressure line and the pilot line system.

In a structurally simple embodiment of the control device both relieving solenoid seat valves may be switched in series in a working flow path from the pressure line to the return system. Since, then, in case of a pressureless circulation the relieving solenoid seat valves have to cope with the entire displacement flow amount, both expediently are designed according to the full working flow rate.

Figure 2:
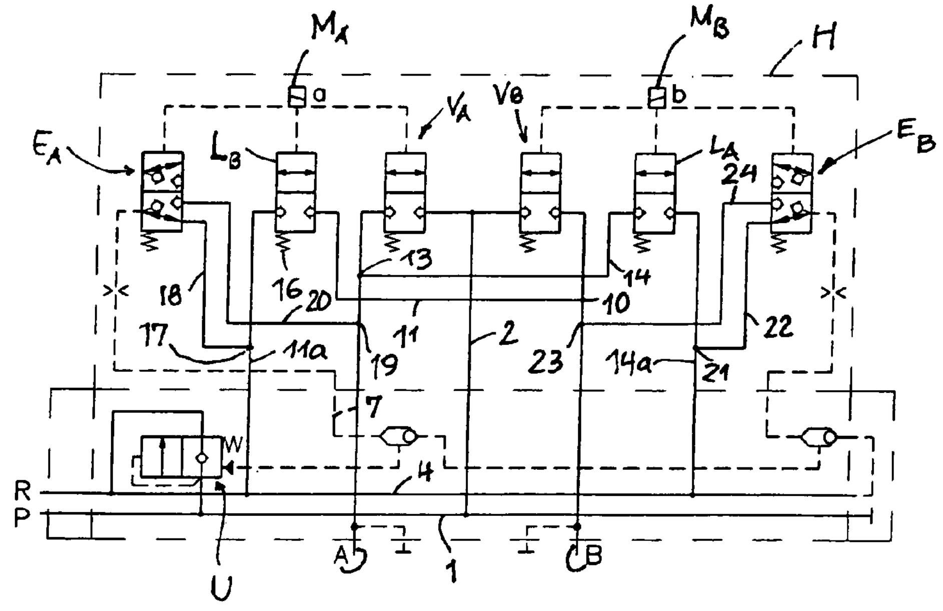
Figure 3:
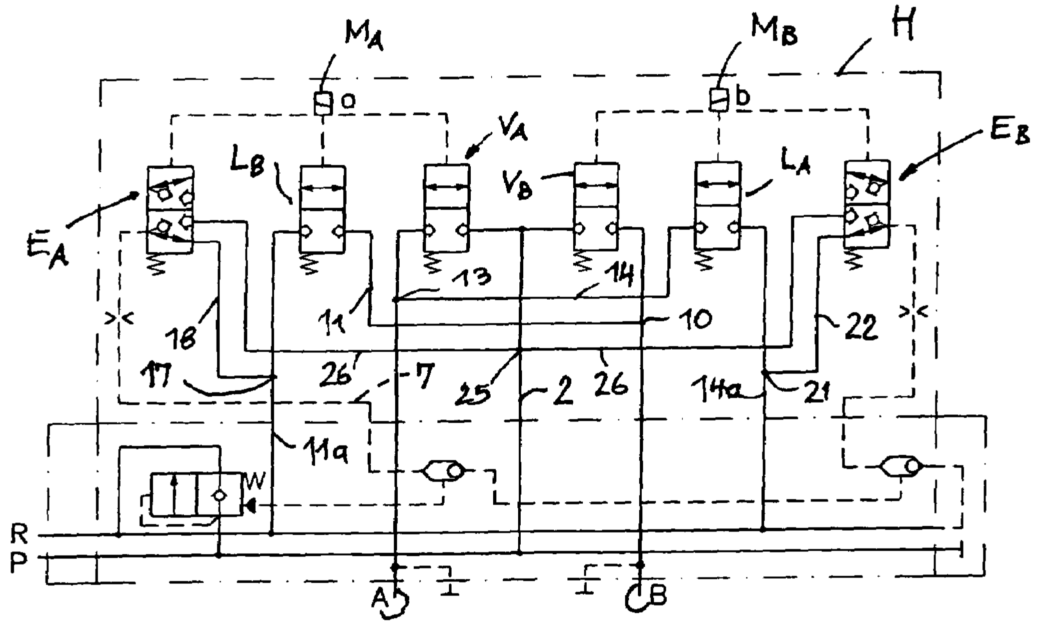
Figure 4:
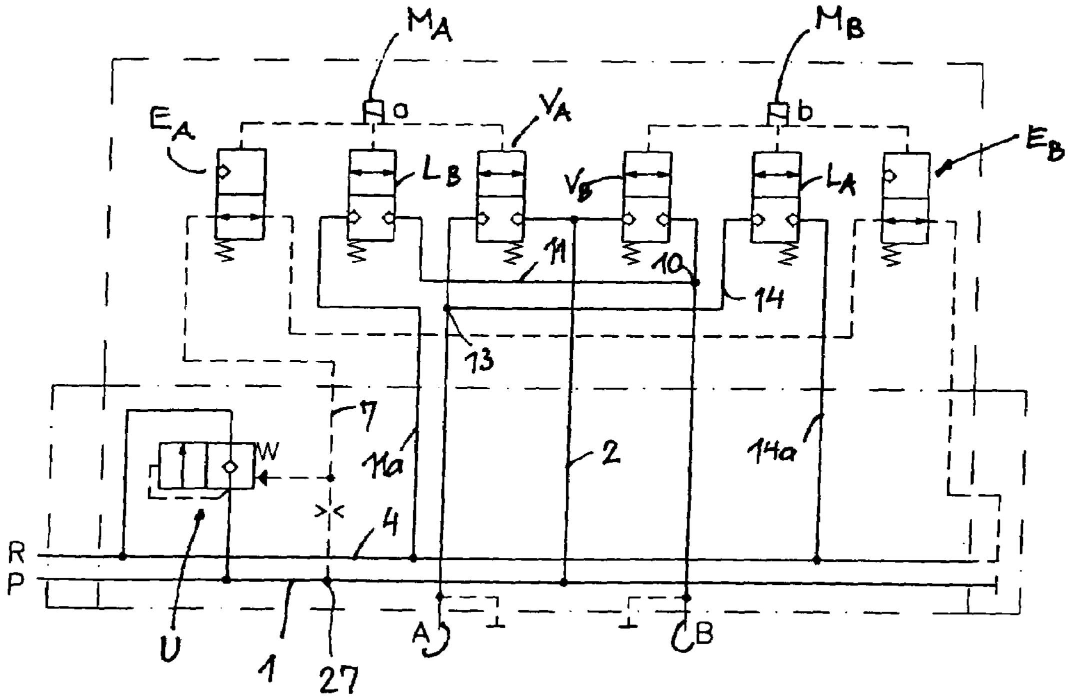
Figure 5:
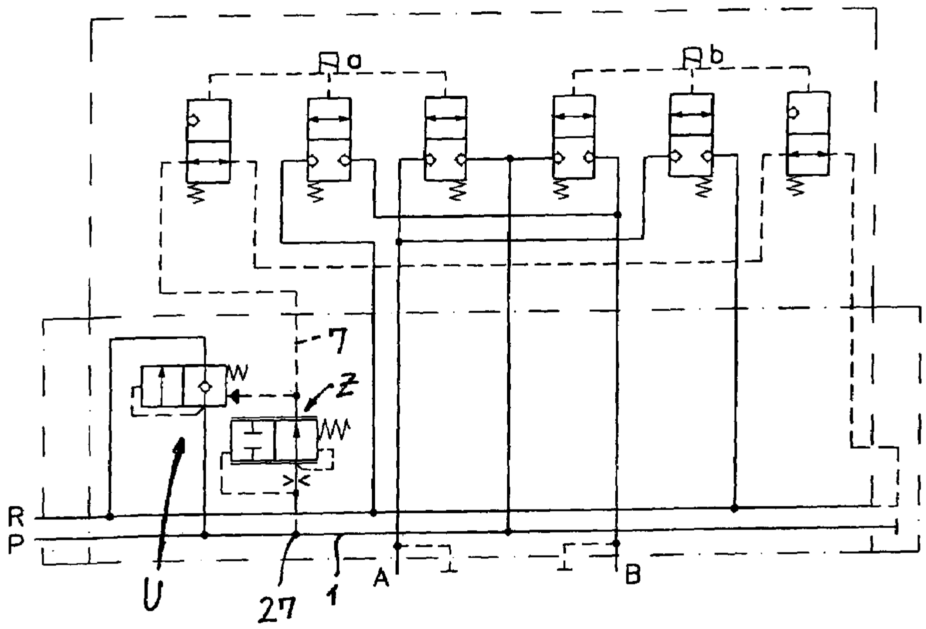
Figure 6:
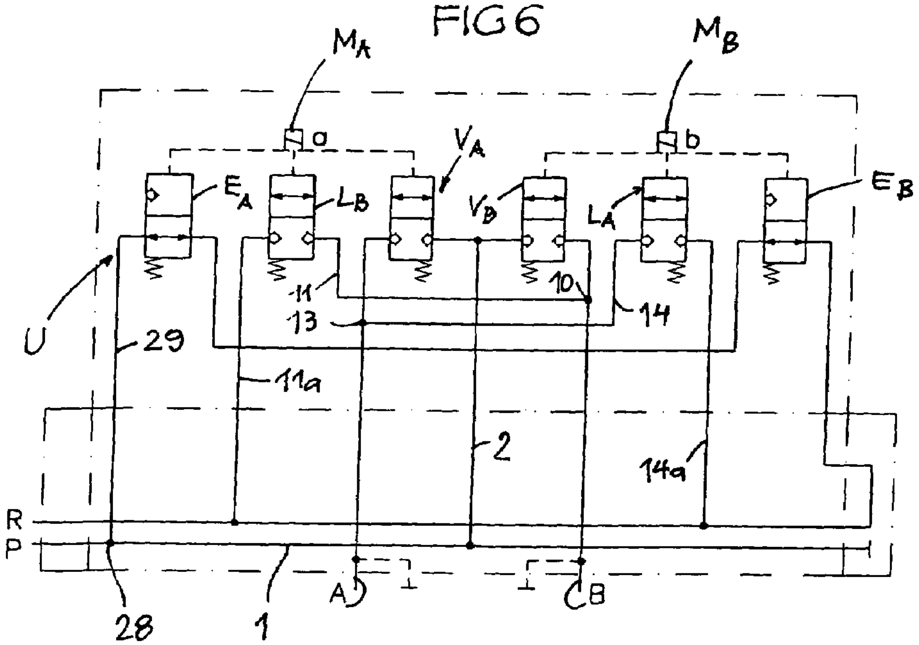

Embodiments of the invention will be explained with the help of the drawings. In the drawings is:

FIG. 1 a block diagram of a first embodiment of an electrohydraulic control device for the direction control of a hydro-consumer, including an embodiment in dotted lines in which several of such electrohydraulic control devices are supplied by a common pressure source, FIG. 2 a block diagram of a second embodiment, FIG. 3 a block diagram of a third embodiment, FIG. 4 a block diagram of a fourth embodiment, FIG. 5 a block diagram of a fifth embodiment, and FIG. 6 a block diagram of a sixth embodiment of the electrohydraulic control device.

An electrohydraulic control device H as shown in FIG. 1 e.g. serves to control the direction of a hydraulic consumer or hydro-motor (not shown) connected to two working lines A, B.

A pressure line 1 is supplied from a pressure source P. A further pressure line 2 branches off from the pressure line 1 and leads to two main directional solenoid seat valves VA, VB each for a respective working line A, B. In the embodiments in FIG. 1 both the main directional solenoid seat valves VA, VB are 3/2-directional solenoid seat valves respectively actuated by a switching solenoid MA, MB. As long as the switching solenoids MA, MB are de-energised, the working lines A, B are separated from the pressure line 2 and at the same time are connected to a return system R via return lines 3 and 4. Leakage free operating check valves 9 in the working lines A, B prevent a backflow.

A line loop 5 between the pressure line 1 and the return line 4 contains a circulation switching assembly U containing a conventional 2/2-directional switching valve or regulating valve which provides a leakage free seat function in the blocking position. This valve is actuated in opening direction by a pilot pressure taken from the pressure line 1 and in closing direction by a regulating spring and a pilot pressure taken from a pilot line system 7.

The pilot line system 7 is connected to the working lines A, B downstream of the main directional solenoid seat valves VA, VB. Correspondingly switched changeover valves 8 lead The respective higher pilot pressure of one working line to the closing side of the circulation switching assembly U.

The pilot line system 7 is connected via a bypass line 7' to the return line 4, in the case that the electrohydraulic control device H is intended for only one hydro-consumer, However, if there are further equal or different control devices connected to the pressure line I and the return line 4, then the shown pilot line system 7 may be connected by a connection line 7" to a further switchover valve 8' which transfers the pilot pressure into the pilot line system in the case that the electrohydraulic control device H is not actuated or if the pilot pressure in the switchover valve 8' is correspondingly high.

At a branch 10 of the working line B a line 11 branches off to a branch 12 of the return line 3, A load holding valve LB in the form of a 2/2-directional solenoid seat valve is provided in the line 11. The load holding valve LB is maintained by a spring 16 in the shown leakage free blocking position. The 2/2-directional solenoid seat valve is solenoid actuated and, in particular, either by the switching solenoid MA of the main directional solenoid seat valve VA or (indicated in doffed lines) by its own switching solenoid M which e.g. always is energized when the switching solenoid MA is energized as well.

In analogous fashion for the working line A a line 14 branches off from a branch 13 to a connection 15 in the return line 3. The line 14 also contains a load holding valve LA in the form of a 2/2-directional solenoid seat valve which is actuated by the switching solenoid MB of the main directional solenoid seat valve VB (or which, in some cases, has its own switching solenoid M).

Function:

In FIG. 1 the electrohydraulic control device is switched off. In the case that the pressure source P supplies pressure medium, the pressure medium is led into the return system via the circulation switching assembly U. In the case that the hydro-consumer is to be actuated via the working line A such That at the same time pressure medium is displaced Through the working line B to the return system, the switching solenoid MA is energised (function a), in order to switch over the main directional solenoid seat valve VA and the load holding valve LB. Thereafter, the pressure line 2 is connected to the working line A and the working pressure prevailing in the working line A is supplied into the pilot line system 7. The result is that the circulation switching assembly U is brought into the shown blocking position or is maintained in the blocking position. The hydro-consumer starts to move. Since the load holding valve LB then is switched in the open position the hydraulic medium from the working line B flows through the line 11 into the return line 3. If the switching solenoid MA is de-energised again the same switching position results as shown in FIG. 1. However, then the working pressure in the working line A is trapped between the return valve 9 and the load holding valve LA. The circulation switching assembly connects the pressure line 1 to the return system such that the pressure line 2 substantially is free of pressure. In order to relieve the working pressure from the working line A it will suffice then to energise the switching solenoid MB for a short while and then to de-energise it again such that the load holding valve LA for a short while is switched open and relieves the working pressure via the line 14 into the return line 3. Then both working lines A, B will be substantially free of pressure.

In case that the hydro-consumer has to be moved in the other direction the switching solenoid MB is energised (function b). The same operation results, as explained above, however, with different directions of flows and with a pilot pressure in the pilot line system 7 which pilot pressure is effecting the circulation switching assembly U via the other switchover valve and the switched switchover valve 8.

In the electrohydraulic control device A in FIG. 2 both main directional solenoid seat valves VA, VB between the pressure line 2 and the working lines A, B are designed as 2/2-directional solenoid seat valves. The load holding valves LB, LA are similar to the 2/2-directional solenoid seat valves of FIG. 1, except with the difference that they block both flow directions in the blocking position. The line parts 11*a* and 14*a* lead respectively directly to the return line 4. At a branch 17 of the line part 11*a* a line 18 branches off to a relieving solenoid seat valve EA for the pilot line system 7 which can be supplied with pilot pressure from the working line A via a line 20 connected to a branch 19. The relieving solenoid seat valve EA, in this embodiment, is a 3/2-directional solenoid seat valve actuated by the switching solenoid MA which also actuates the load holding valve LB and the main directional solenoid seat valve VA. Alternatively (not shown) the relieving solenoid seat valve EA (even also the load holding valve LB) may be equipped with its own switching solenoid.

In similar fashion a line 22 branches off a branch 21 from the line part 14*a* and leads to a relieving solenoid seat valve EB which is also designed as a 3/2-directional solenoid seat valve and which is actuated from the switching solenoid MB of the other main directional solenoid seat valve VB. In order to take the pilot pressure for the pilot line system 7 via the relieving solenoid seat valve EB a line 24, corresponding to the line 20, branches off from a branch 23 of the working line B.

Function;

In the case that the hydro-consumer is to be controlled via the working line A the switching solenoid MA is energised (function a) which switches the valves VA, LB and EA substantially simultaneously into the other switching positions. Then the pressure line 2 is connected to the working line A while the working line B is connected to the return line 4 via the line 11 and the line part 11*a*. The pilot line system 7, which was previously relieved via the line 18 to the return system R, now contains the pilot pressure from the working line A and the line 20. If the control device H is switched off now, first the working pressure is maintained in the working line A, because the lines 20 and 14 are blocked without leakage, as well as the working line A itself. In order to relieve the working pressure from the working line A it suffices to energise the switching solenoid MB for a short while (function b), in order to relieve the working pressure via the line 14 and the load holding valve LA and the line part 14*a* into the return line 4.

The embodiment of the electrohydraulic control device in FIG. 3 differs from the one in FIG. 2 by the fact that the pilot pressure for the pilot line system 7 is taken directly from the pressure line 2. For this purpose lines 26 lead from a branch 25 of the pressure line 2 to the relieving solenoid seat valves EA and EB. The further function corresponds to the one of FIG. 2.

The embodiment of FIG. 4 differs from the embodiments of FIGS. 2 and 3 in another way of obtaining the pilot pressure for the pilot line system 4. In this case the pilot pressure directly is taken at a branch 27 of the pressure line 1. The relieving solenoid seat valves EA and EB are simple 2/2-directional solenoid seat valves in the pilot line system which only have to be designed for the small flow rate of the pilot pressure medium and which block without leakage in flow direction to the return system R. Both relieving solenoid seat valves EA and EB are provided in series in the pilot line system 7. The function is substantially the same as the function explained for FIGS. 2 and 3. In order to relieve the working pressure from the working line A, after the control device has been switched off, the switching solenoid MB is energised for a short while. In order to relieve the working pressure from the working line B, the switching solenoid MA is energised for a short while.

The embodiment of FIG. 5 corresponds substantially to the embodiment of FIG. 4. A difference is that as a part of the circulation switching assembly U a two-way flow rate regulating valve Z is provided in the pilot line system 7 for which the pilot pressure is directly taken from the branch 27 in the pressure line 1. The two-way flow rate regulating valve Z gradually doses the amount of the pilot pressure medium in the pilot line system 7. The two-way flow rate regulating valve operates according to the principle of a pressure balance or pressure compensator actuated by pilot pressures upstream and downstream of a restriction and by a regulating spring. The further function corresponds to the function of FIG. 4.

The embodiment of FIG. 6 corresponds substantially to the embodiments of FIGS. 4 and 5. A difference lies in the circulation switching assembly U which in this case is operated with a working line 29 and without a pilot line system. The working line 21 leads from a branch 28 in the pressure line 1 via the relieving solenoid seat valves EA, EB which are switched in series to the return system R. In this embodiment the relieving solenoid seat valves EA, EB are designed such that they can process the entire working flow from the pressure source during the condition of the pressureless circulation. The further functions corresponds to the functions as described for FIGS. 4 and 5. In order to relieve the working pressure from the working line A it suffices to energise the switching solenoid MB after switching off the control device for a short while (function b). For relieving the working pressure from the working line B the switching solenoid MA has to be energised for a short while (function a).

The invention claimed is:

1. Electrohydraulic control device for a hydro-motor operating in a portable working device, the electrohydraulic control device comprising a control system, first and second working lines connected to the hydro-motor, a pressure source and a return system, a first main directional solenoid seat valve connected between the first working line and both the pressure source and the return system, a second main directional solenoid seat valve connected between the second working line and both the pressure source and the return system, each of the first and second main directional solenoid seat valves being designed for being switched by the control system between two switching positions for either connecting the connected working line with the return system and separating the working line from the pressure source, or connecting the connected working line with the pressure source and separating the working line from the return system, a first load holding valve connected between the second working line and the return system, a second load holding valve connected between the first working line and the return system, each of the first and second load holding valves being designed to be selectively switched by the control system between two switching positions for either connecting the connected working line with the return system or separating the connected working line from the return system without leakage to maintain the working pressure of the hydro-motor in the connected working line, the first load holding valve being switched to connect the second working line with the return system at the same time that the first main directional solenoid seat valve is switched to connect the first working line with the pressure source, the second load holding valve being switched to connect the first working line with the return system at the same time that the second main directional solenoid seat valve is switched to connect the second working line with the pressure source, a circulation switching assembly connected between the pressure source and the return system so that a pressureless circulation is allowed from the pressure source into the return system when the first and second working lines are both separated from the pressure source, and a respective one of first and second backflow preventing valves being provided between the first main directional solenoid seat valve and the first working line and between the second main directional solenoid seat valve and the second working line, wherein the first and second load holding valves are 2/2-directional solenoid seat valves each of which is designed for selectively being switched into the switching position for connecting the connected working line to the return system either by a routine or by a selective actuation of the control system by a short electric switching pulse after the electrohydraulic control device has been switched off, for intentionally relieving pressure from the connected working line into the return system which pressure is trapped in the connected working line between the hydro-motor and the respective backflow preventing valve when the electrohydraulic control device has been switched off.

2. Electrohydraulic control device according to claim 1, wherein the load holding 2/2-directional solenoid seat valve for one working line and the main directional solenoid seat valve for the other working line are directly actuated by a common switching solenoid.

3. Electrohydraulic control device according to claim 1, wherein the load holding 2/2-directional solenoid seat valve for a respective working line has its own switching solenoid which is energized at the same time as the switching solenoid of the main directional solenoid seat valve of the other working line for the directional control of the hydro-motor, and that the separate switching solenoid is energized electrically by a short switching pulse selectively and separate from the switching solenoid of the main directional solenoid seat valve of the respective other working line for intentionally relieving the trapped pressure in the working line containing the energized local holding valve.

4. Electrohydraulic control device according to claim 1, wherein the circulation switching assembly is actuated by a pilot pressure selectively taken directly or indirectly via a pilot line system from a respective working line or from a pressure line connected to the pressure source, and wherein a solenoid actuated pilot pressure relieving solenoid seat valve is connected for each working line between the pilot line system and the return system, and wherein the relieving solenoid seat valve has its own switching solenoid or shares a common switching solenoid with the main directional solenoid seat valve associated to the respective working line.

5. Electrohydraulic control device as in claim 4, characterized in that the relieving solenoid seat valve (EA) is switched open either by its own solenoid actuated at the same time as the switching solenoid (MA, MB) of the main directional solenoid seat valve (VA, VB) associated to this working line (A or B), or by the switching magnet (MA, MB) of the main directional solenoid seat valve (VA, VB), respectively.

6. Electrohydraulic control device as in claim 4, characterized in that the relieving solenoid seat valve (EA, EB) is a 3/2-directional solenoid seat valve in a case when the pilot pressure is taken indirectly from the working line (A, B) or from the pressure line (1, 2), respectively.

7. Electrohydraulic control device as in claim 4, characterized in that the relieving solenoid seat valve (EA, EB) is a 2/2-directional solenoid seat valve in a case when the pilot pressure directly is taken from the pressure line (1, 2).

8. Electrohydraulic control device as in claim 4, characterized in that both relieving solenoid seat valves (EA) of the circulation switching assembly (U) are switched in series in a working flow path (29) from the pressure line (1) to the return system (R), and that both relieving solenoid seat valves (EA) are designed for the full working flow.

9. Electrohydraulic control device as in claim 1, characterized in that the circulation switching assembly (U) contains a 2/2-way circulation pressure balance valve between the pressure line (1) and the return system (R).

10. Electrohydraulic control device as in claim 9, characterized in that a two-way flow rate regulating valve (Z) associated to the 2/2-directional circulation pressure balance valve in the pilot line system (7) in a case where the pilot pressure directly is taken from the pressure line (1).

* * * * *